(12) United States Patent
Nam

(10) Patent No.: US 7,106,684 B2
(45) Date of Patent: Sep. 12, 2006

(54) DEVICE FOR WRITING AND READING DATA BY USING CANTILEVER

(75) Inventor: Hyo Jin Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 10/390,794

(22) Filed: Mar. 19, 2003

(65) Prior Publication Data
US 2003/0179685 A1 Sep. 25, 2003

(30) Foreign Application Priority Data
Mar. 19, 2002 (KR) ............... P 10-2002-0014633

(51) Int. Cl.
G11B 9/00 (2006.01)
(52) U.S. Cl. .................................... 369/126
(58) Field of Classification Search ...... None
See application file for complete search history.

(56) References Cited

U.S. PATENT DOCUMENTS

| 5,268,571 | A | * | 12/1993 | Yamamoto et al. | 250/306 |
|---|---|---|---|---|---|
| 5,576,483 | A | * | 11/1996 | Bonin | 73/862.626 |
| 5,666,190 | A | * | 9/1997 | Quate et al. | 355/71 |
| 5,856,617 | A | * | 1/1999 | Gurney et al. | 73/105 |
| 5,856,672 | A | * | 1/1999 | Ried | 250/306 |
| 5,856,967 | A | * | 1/1999 | Mamin et al. | 369/126 |
| 5,883,705 | A | * | 3/1999 | Minne et al. | 73/105 |
| 6,000,280 | A | * | 12/1999 | Miller et al. | 73/105 |
| 6,079,255 | A | * | 6/2000 | Binnig et al. | 73/105 |
| 6,650,135 | B1 | * | 11/2003 | Mautz et al. | 324/765 |
| 6,851,301 | B1 | * | 2/2005 | Kim et al. | 73/105 |

FOREIGN PATENT DOCUMENTS

JP 04095741 A * 3/1992

OTHER PUBLICATIONS

T Itoh et al., ("Development of force sensor for atomic formicroscope using piezoelectric thin film"), Apr. 1993, Nanotechnology, pp. 218-224, UK.*
Xiaoyu Yang, (MEMs for high density storage,project of Spring 2000, University of Buffalo, http://www-ee.eng.buffalo.edu/courses/ee541project.htm.*
Indermuhle, "Atomic force microscopy using cantilevers with integrated tips and piezoelectric layers for actuation and detection," Jul. 1997, pp. 218-220, journal Micromechanical microengineering, UK.*

* cited by examiner

Primary Examiner—Thang V. Tran
Assistant Examiner—Nathan Danielsen
(74) Attorney, Agent, or Firm—Flesnher & Kim, LLP

(57) ABSTRACT

Device for writing and reading a data including a floated cantilever part connected to a support, a resistively heated tip at an end of the cantilever part, and a piezoelectric sensor formed on the cantilever part, thereby preventing an occurrence of a sensing error by reading a data and reducing power consumption by using a piezoelectric sensor, and tip wear by making heights of the cantilever array uniform by using piezoelectric actuators.

4 Claims, 4 Drawing Sheets

DEVICE FOR WRITING AND READING DATA BY USING CANTILEVER

This application claims the benefit of the Korean Application No. P2002-14633 filed on Mar. 19, 2002, which is hereby incorporated by reference.

BACKGROUND OF THE INVENTION

1. Field of the Invention

The present invention relates to a device for writing and reading data by using a cantilever, and more particularly, to a device for writing and reading data by using a cantilever, in which a resistively heated tip is used in writing data and a piezoelectric-sensor is used in reading data, for prevention of sensing error and reduction of a power consumption, and piezoelectric actuator array makes the height of cantilever array be uniform, for prevention of wear of a tip.

2. Background of the Related Art

In general, an Atomic Force Microscopy (AFM) measures a surface form and the like by using a micron cantilever. The cantilever has a tip of a few nm size at an end thereof, for measuring an atomic force between the tip and a specimen for detecting the surface form or electric or magnetic properties of the specimen.

Recently, research on nano-lithography devices or nano data storages of the atomic force microscopy principle has been active. The atomic force microscopy principle enables storage of data using a probe of a few nm in size, to develop a data storage having a storage density higher than a tera bit/in$^2$. IBM of the USA has studied a data storage device of a polymer recording medium of the atomic force microscopy principle for a few years.

FIG. 1 illustrates a perspective view showing a state in which a related art atomic force microscopy writes data, schematically, wherein the IBM has designed the AFM data storage device provided with two dimensionally linked 32×32 unit cantilevers each inclusive of a silicon tip 10, a resistive heater platform 11 at the tip part, a unit cantilever having a cantilever part 12 connected to the resistive heater platform 11 and floated by a support 13.

In writing data by using the data storage device, the silicon tip is heated, to reduce a viscosity of the polymer recording medium 22 on a silicon substrate 21, a force is applied to the recording medium 22 locally by using the silicon tip 10, to form an data storage recess 23 in the recording medium 22. Thus, data is recorded.

On the other hand, referring to FIGS. 2A and 2B, in reading data by using the AFM data storage device, a principle is used, in which a heater cooling rate is varied with a distance between the heater platform and the recording medium.

In more detail, referring to FIG. 2A, if the silicon tip 10 is inserted into the data storage recess 23 in the recording medium 22, making a distance between the heater platform 11 and the recording medium 22 near, the heater platform 11 is cooled down quickly, and, referring to FIG. 2B, if the silicon tip is on a flat surface of the recording medium, with the distance between the heater platform 11 and the recording medium 22 far, the heater platform 11 is cooled down slowly.

Such a difference of cooling down rates varies a temperature of the heater platform 11, with a consequent variation of electric resistance, using which data is read.

Though the related art AFM data storage cantilever developed by the IBM has an advantage of simple fabrication process, it has the following problems.

First, the parallel cantilever array for faster AFM data storage is liable to cause failure in forming uniform heights of the cantilever tips due to deviations of layers of SOI substrates, and etching, which in turn causes deviations between the recording medium and the cantilever tips. The height deviation is greater than approx. 80 nm, significantly greater than a depth of the data storage recess of 40 nm, that deteriorates a reliability of the AFM data storage, and causes a serious wear down problem.

Second, the array of cantilevers require to have uniform heater platforms. If resistances of the heaters are not uniform, a reading reliability can not be secured.

Third, the heating of the heater platform to approx. 350° C. for detecting change of resistance of the heater platform and reading a data consumes much power, and, in the case of the array of the cantilevers, the power consumption is much higher as hundreds of heaters are heated at the same time. Since the nano data storage of the AFM principle is mostly for application to portable apparatuses, the high power consumption is a big disadvantage.

SUMMARY OF THE INVENTION

Accordingly, the present invention is directed to a device for writing and reading data by using a cantilever that substantially obviates one or more of the problems due to limitations and disadvantages of the related art.

An object of the present invention is to provide a device for writing and reading data by using a cantilever, in which a resistively heated tip is used in writing data and a piezoelectric-sensor is used in reading data, for prevention of sensing error and reduction of a power consumption, and the piezoelectric actuator array makes the height of cantilever array be uniform, for prevention of wear of a tip.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for writing and reading a data includes a floated cantilever part connected to a support, a tip at an end of the cantilever part, and a piezoelectric sensor formed on the cantilever part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
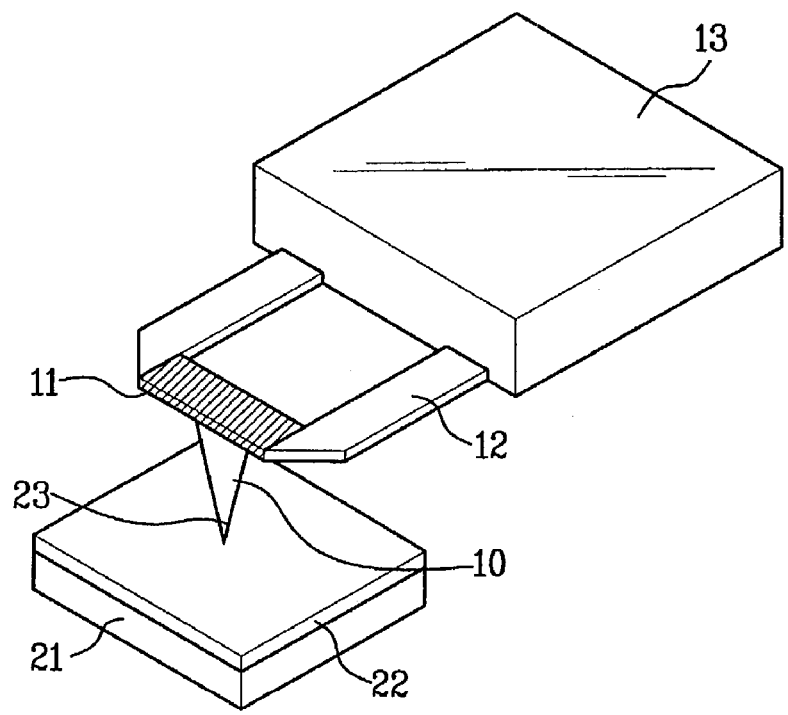
FIG. 1 illustrates a perspective view showing a state in which a related art atomic force microscopy writes data, schematically.
Figure 2A:
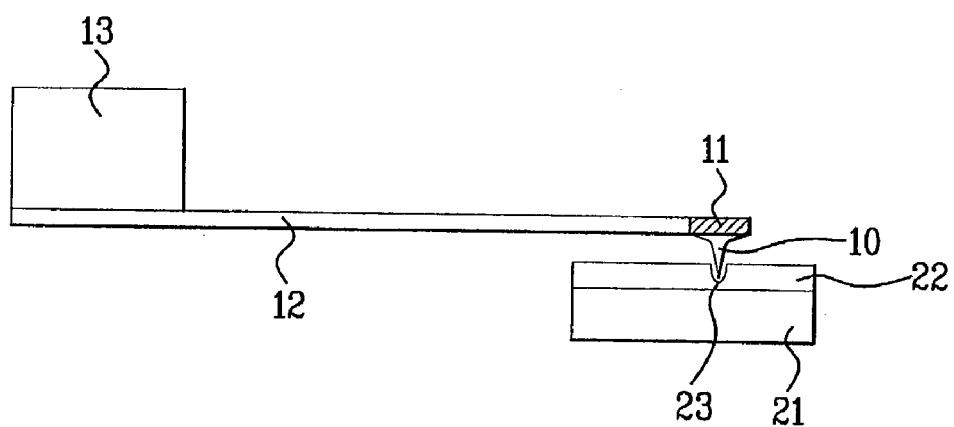
FIGS. 2A and 2B illustrate the steps of a process for reading of a related art atomic force microscopy data storage.
Figure 2B:
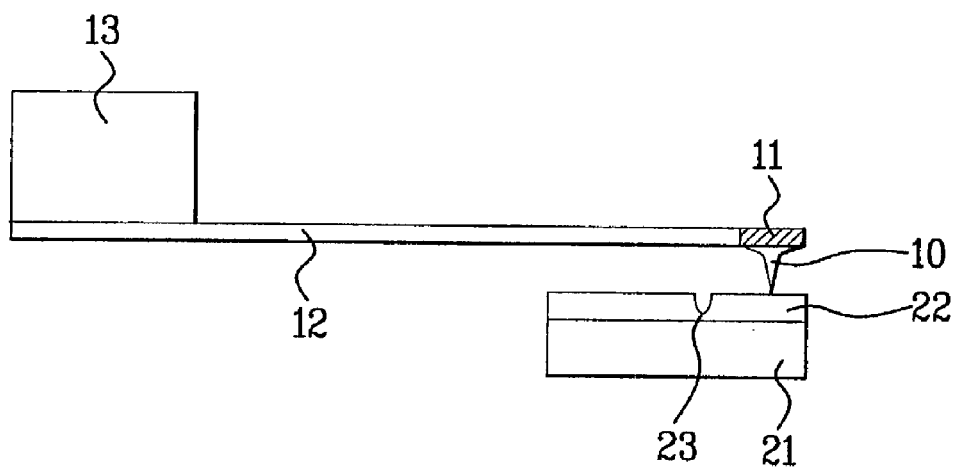
Figure 3:
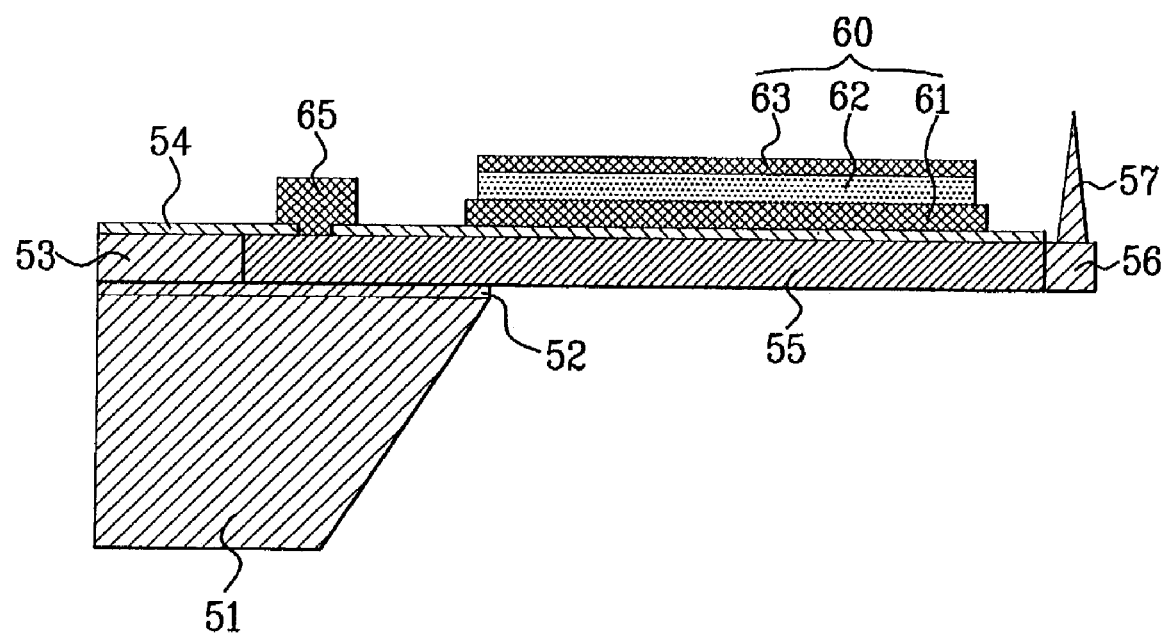
FIG. 3 illustrates a section of a device for writing a data by using resistively heated tip and reading a data by using a piezoelectric sensor in accordance with a first preferred embodiment of the present invention.

FIG. 3 illustrates a section of a device for writing a data by using resistively heated tip and reading a data by using a piezoelectric sensor in accordance with a first preferred embodiment of the present invention, inclusive of a silicon support having a first silicon layer 51, a silicon oxide film 52, and a second silicon layer 53, a floated cantilever part formed by etching a bottom of one side part of the second silicon layer 53, a PZT capacitor 60 having a lower electrode 61, a PZT film 62 and an upper electrode 63 on a silicon nitride film 54 on the second silicon layer 53, and a tip 57 at an edge of the second silicon layer of the cantilever part.

Figure 4:
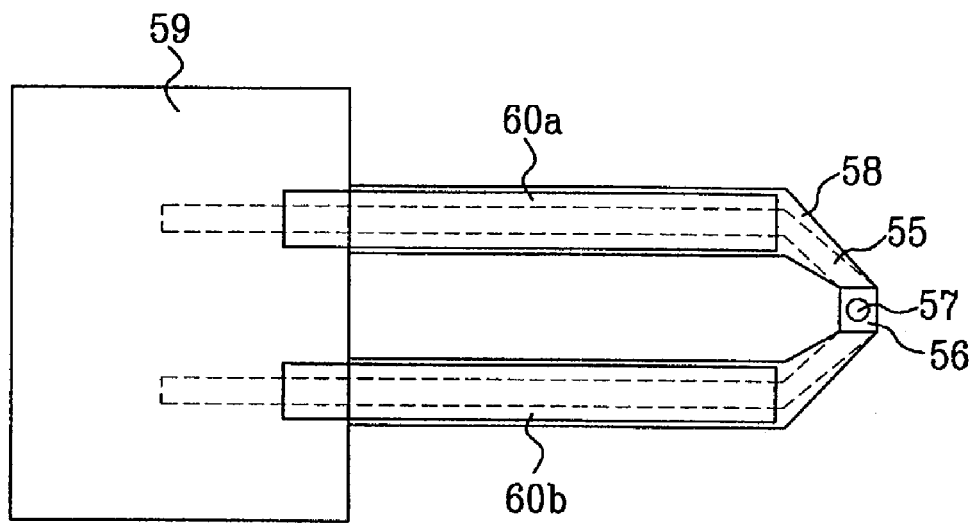
FIG. 4 illustrates a plan view of a device for writing a data by using resistively heated tip and reading a data by using a piezoelectric sensor in accordance with a first preferred embodiment of the present invention, schematically.

Referring to FIG. 4, the device for writing and reading a data in accordance with a first preferred embodiment of the present invention includes a two lines of cantilever part 58 floated from a support 59, a heater 56 at a part the two lines of cantilever meet, and a tip 57 on the heater 56.

Each of the two lines of the cantilever part 58 has a highly doped region 55 connected to the support 59 for heating the tip 57 so that the tip can form a data storage recess in the recording medium. It is preferable that the heater 56 and the tip 57 are formed by doping $5 \times 10^{14}$ of boron or phosphorus.

Together with this, the two lines of the cantilever part 58 have first and second PZT capacitors 60a and 60b respectively, for detecting a piezoelectric charge generated at a piezo thin film caused by bending of the cantilever part when the tip passes the data storage recess in the recording medium, and reading a data.

Of course, as shown in FIG. 3, there are electrode pads 65 on the support for providing a voltage to the doped regions 55 to heat the heaters 56 and detecting piezoelectric charges from the PZT capacitors 60a and 60b respectively.

Figure 5:
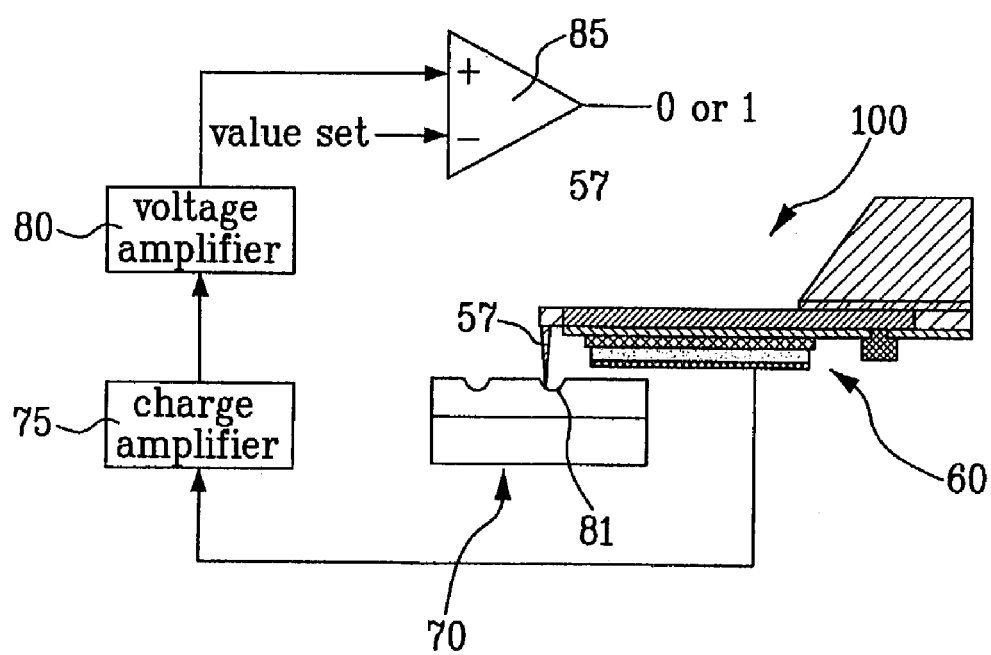
FIG. 5 illustrates a concept of a process for reading a data with a device for writing and reading a data of the present invention.

FIG. 5 illustrates a concept of a process for reading a data with a device for writing and reading a data of the present invention, wherein a data is read by detecting a piezoelectric charge induced at the PZT capacitor 60 when a probe passes a recording medium 70 having a data storage recess 81.

The piezoelectric charge thus induced is converted into a voltage at a charge amplifier 75. The amplified signal is compared to a value set at an initial time at a comparator 85, and verified as being '0' or '1'.

In the meantime, in the detection of resistance variation of the related art thermo-resistive sensor, a reference resistance is required since it is required to detect a relative amount of variation of the resistance. Particularly, if the resistors formed in the cantilevers are not uniform, there can be an error in a sensor signal, it is required that every cantilever has a reference resistor having a resistance the same with the sensor. However, it is difficult to form the reference sensor having the same resistance, and causes to require a large area of the device.

Opposite to this, the device for reading a data of the present invention can dispense with the reference resistor owing to the use of the piezoelectric sensor of the PZT capacitor, because, when the probe passes through the data storage recess in the recording medium, the cantilever deforms, to induce a charge on the surface, and when the probe passes through a region without the data storage recess, the cantilever has no change, not to induce the charge.

Moreover, since the device for writing and reading a data of the present invention generates no heat at the piezoelectric sensor of PZT capacitor, the power consumption is very small compared to the thermo-resistive type sensor.

However, alike the AFM cantilever of the IBM, since the height deviation of the cantilevers is liable to occur as before, the mechanical wear of the tip cannot be prevented.

Figure 6:
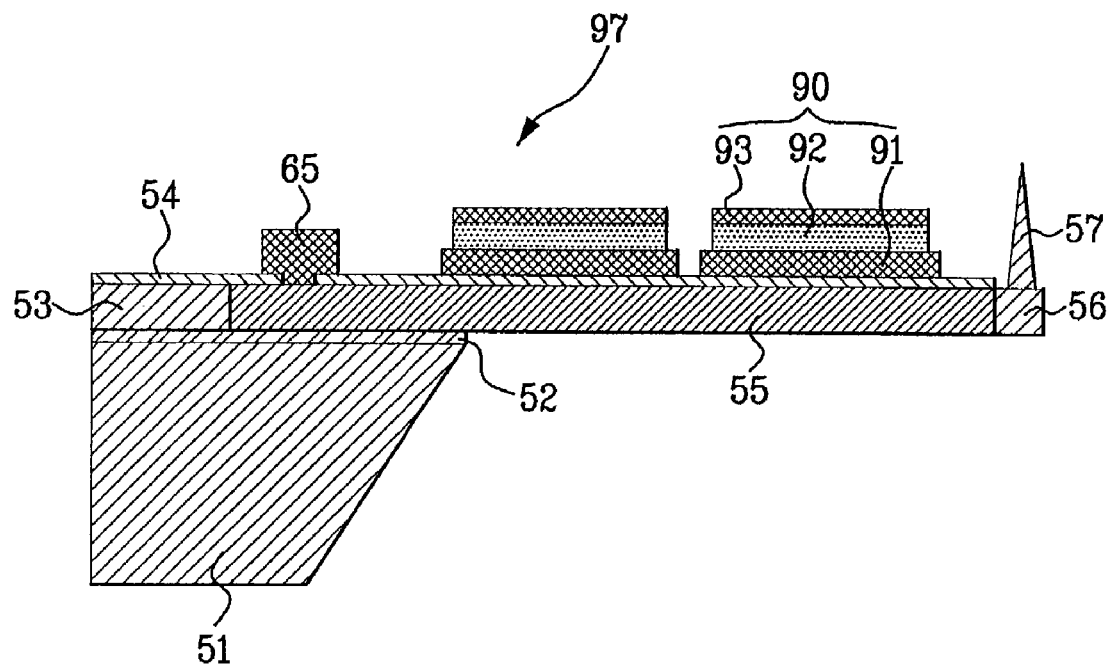
FIG. 6 illustrates a section of a device for writing and reading a data while making tip height constant using a piezoelectric actuator in accordance with a second preferred embodiment of the present invention, schematically.
Figure 7:
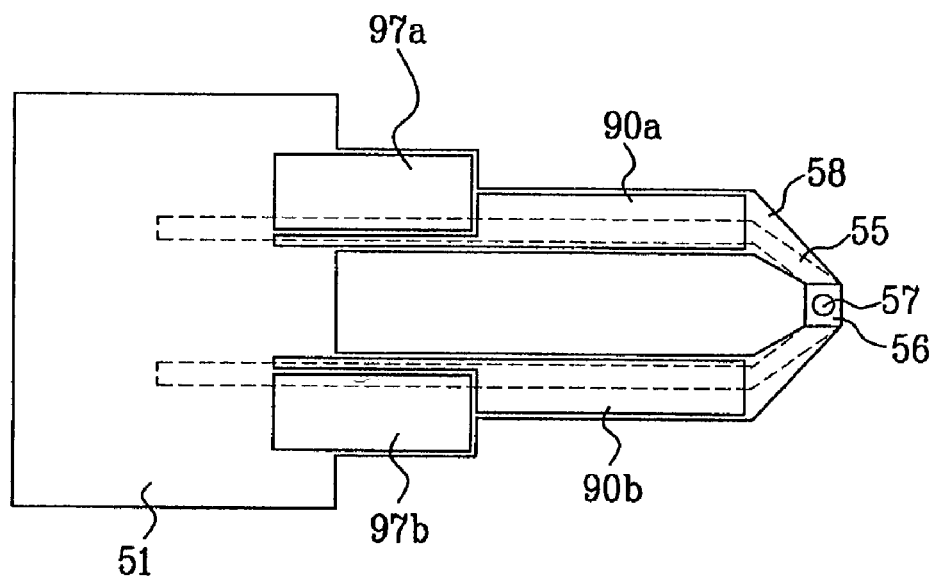
FIG. 7 illustrates a plan view of a device for writing and reading a data while making tip height constant using a piezoelectric actuator in accordance with a second preferred embodiment of the present invention, schematically.

Therefore, referring to FIGS. 6 and 7, in the second embodiment of the present invention, a device for writing and reading a data which has a function of an actuator and a function of a sensor at a time.

FIG. 6 illustrates a section of a device for writing and reading a data while making tip height constant using a piezoelectric actuator in accordance with a second preferred embodiment of the present invention schematically, inclusive of a silicon support having a first silicon layer 51, a silicon oxide film 52, and a second silicon layer 53, a floated cantilever part formed by etching a bottom of one side part of the second silicon layer 53, a silicon nitride film 54 on the second silicon layer 53, a tip 57 at an edge of the cantilever part, and a piezoelectric sensor 90 and a piezoelectric actuator 97 each having a lower electrode 91, a PZT film 92, and an upper electrode 93 formed on the silicon nitride film 54. The piezoelectric sensor 90 is formed close to the tip 57, and the piezoelectric actuator 97 is formed closer to the support.

In order to prevent an electrical cross-coupling, it is preferable that a region of the cantilever the piezoelectric actuator is formed therein has a spring constant 10 to 20 times higher than the same of a region of the cantilever the piezoelectric sensor is formed therein.

Though the second embodiment device for writing and reading a data has the same writing process and, also as shown in FIG. 5, the same reading process, with the first embodiment device for writing and reading a data, the second embodiment device differs from the first embodiment device in that the second embodiment device can correct the height deviation by using the piezoelectric actuators before carrying out the writing and reading if cantilever array is formed.

Even though there is a deviation of heights of the cantilevers caused by different thickness of the cantilevers when the cantilever array is formed, the height deviation of the cantilevers can be corrected by bending the piezoelectric actuator in advance, so that ends of the tips have the same height.

In more detail, when a plurality of cantilevers are form in array, the plurality of cantilevers have different heights from one another. In this instance, a voltage is provided to the piezoelectric actuator with a tip having a relatively high tip height and bend the cantilever to bring the tip height to an average tip height, thereby making the tip heights uniform.

Eventually, the device for writing and reading a data of the present invention has advantages in that uniform sensing characteristics can be provided as the cantilever tips write and read data at uniform height over the recording medium, a longer lifetime compared to the related art device as tip wear can be prevented, and power consumption can be reduced as the reference resistance sensor can be dispensed with.

As has been described, the device for writing and reading a data of the present invention can prevent an occurrence of a sensing error by reading a data and can reduce power consumption by using a piezoelectric sensor, and tip wear by making heights of array the cantilevers uniform by using piezoelectric actuators.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A device for writing and reading data, comprising:
   a floated cantilever part connected to a support;
   a tip at an end of the cantilever part;
   a piezoelectric sensor formed on a surface of the cantilever part and formed with a lower electrode and a PZT capacitor comprising a lower electrode, a PZT film, and an upper electrode; and
   a piezoelectric actuator formed adjacent to the piezoelectric sensor on the same surface of the cantilever part, and formed with a PZT capacitor comprising a lower electrode, a PZT film, and an upper electrode, wherein a spring constant of a region of the cantilever part on which the piezoelectric actuator is formed is 10 to 20 times higher than a region of the cantilever part on which the piezoelectric sensor is formed.

2. The device as claimed in claim 1, further comprising:
   a heater on the cantilever part under the tip for heating the tip; and
   a highly doped region on the cantilever part connected to the heater for providing a voltage to the heater.

3. The device as claimed in claim 2, wherein the heater is formed by doping boron or phosphorus.

4. The device as claimed in claim 1, further comprising an array of cantilever parts each connected to the support, wherein each cantilever part has a piezoelectric actuator for making tip heights of the cantilever parts uniform.

* * * * *